March 4, 1952  A. A. GREEN  2,588,109
DRIVE MECHANISM FOR TOYS
Filed Jan. 3, 1949  2 SHEETS—SHEET 1
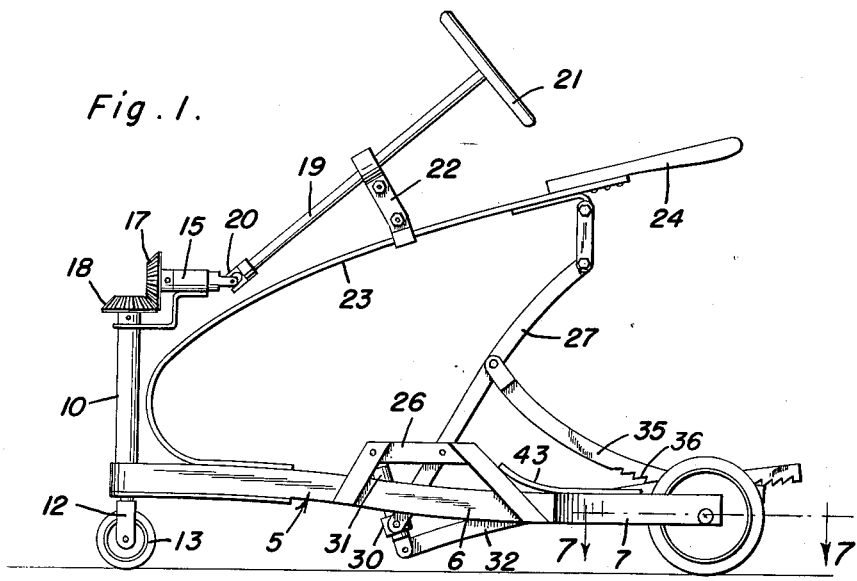
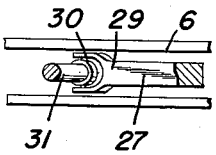
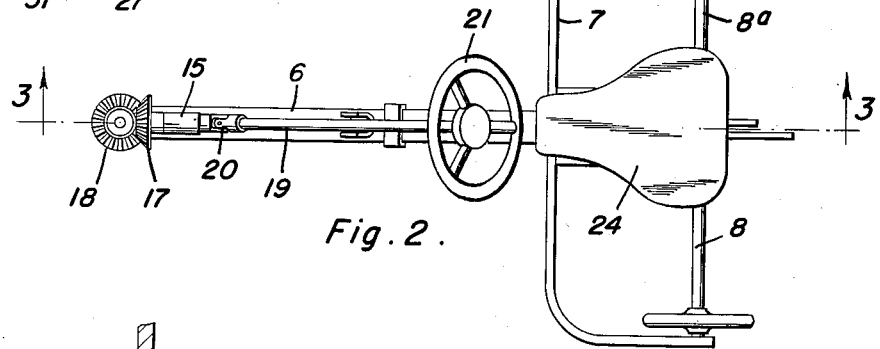
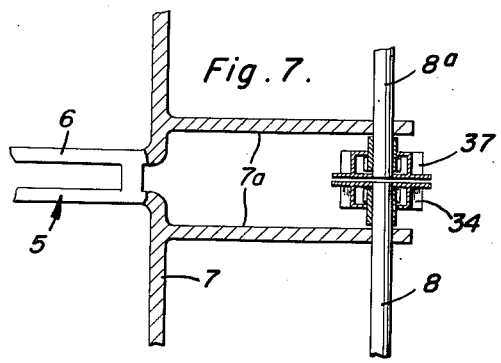
Arlando Alen Green
INVENTOR.

March 4, 1952  A. A. GREEN  2,588,109
DRIVE MECHANISM FOR TOYS
Filed Jan. 3, 1949  2 SHEETS—SHEET 2
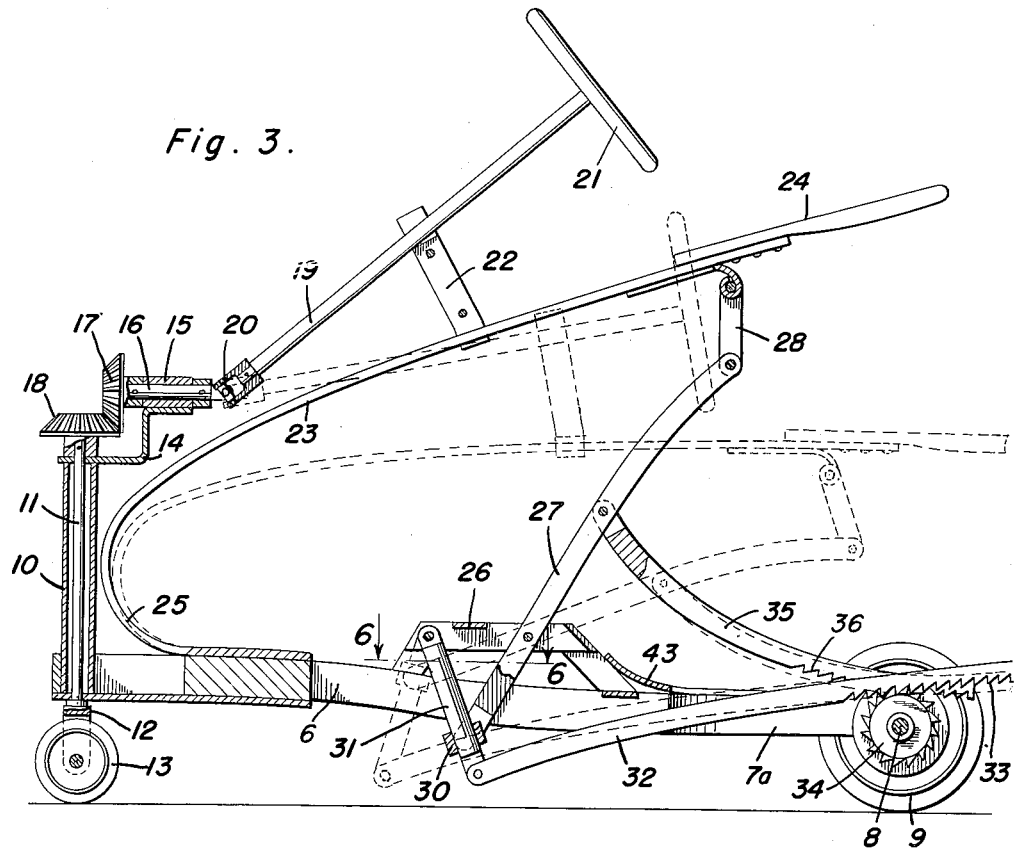
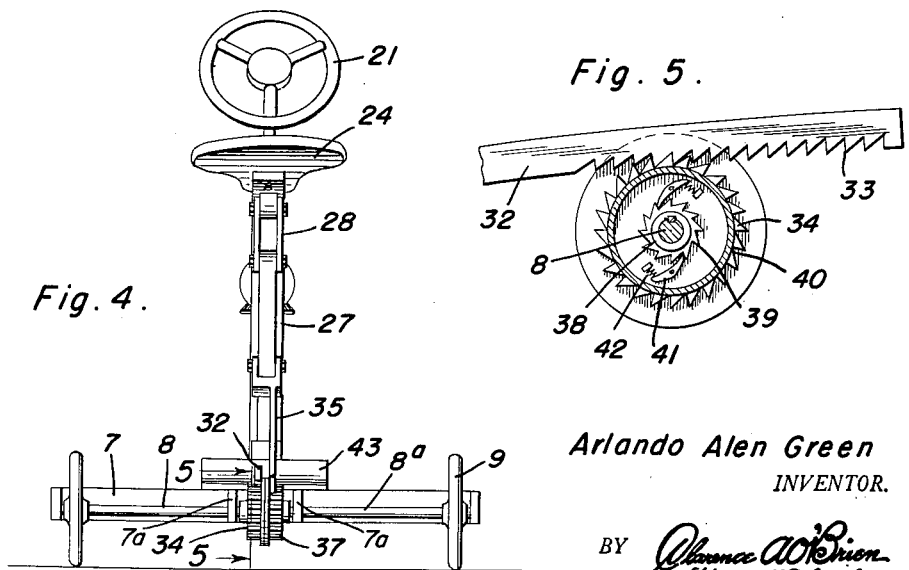
Arlando Alen Green
INVENTOR.

Patented Mar. 4, 1952

2,588,109

UNITED STATES PATENT OFFICE 2,588,109

DRIVE MECHANISM FOR TOYS

Arlando Alen Green, Versailles, Ind.

Application January 3, 1949, Serial No. 68,857

4 Claims. (Cl. 280—226)

The present invention relates to new and useful improvements in drive mechanisms for toys and more particularly to means for driving a toy vehicle or the like.

An important object of the invention is to provide drive means for toy vehicles operated by the weight of the rider or occupant of the vehicle.

A further object of the invention is to provide an oscillating seat for the child occupying the vehicle and which, through the weight of the child operates a ratchet mechanism for driving the wheels of the vehicle.

A further object of the invention is to provide steering means for the vehicle and including a steering post and steering wheel, the latter including a shaft supported by the oscillating seat and connecting the shaft to the steering post by means of a universal joint to permit an effective steering control of the vehicle during the oscillating movement of the seat and steering wheel.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is an enlarged longitudinal sectional view taken substantially on a line 3—3 of Figure 2.

Figure 4 is a rear elevational view.

Figure 5 is an enlarged transverse sectional view of the ratchet mechanism taken on a line 5—5 of Figure 4.

Figure 6 is a fragmentary sectional view of the connection for one of the ratchet operating arms and the rockable lever taken substantially on a line 6—6 of Figure 3, and Figure 7 is an enlarged fragmentary sectional view of the ratchets taken on a line 7—7 of Figure 1.

Referring now to the drawings in detail wherein for the purpose of illustration I have disclosed a preferred embodiment of the invention, the numeral 5 designates a frame formed of a pair of spaced apart substantially parallel beams 6 suitably connected to each other and provided at their rear ends with a substantially U-shaped rear axle supporting frame 7 and a pair of spaced parallel rearwardly extending arms 7a positioned between the sides of frame 7 and parallel thereto.

A pair of rear axles 8 and 8a are supported in the axle frames 7 and arms 7a with a wheel 9 suitably secured to each axle adjacent the end thereof.

A steering column 10 is supported in a vertical position at the front end of frame 5 with a steering post or shaft 11 journaled therein and having a yoke 12 suitably secured at its lower end in which a front wheel 13 is journaled.

A bracket 14 is suitably secured on the upper end of column 10 and is provided with a horizontal longitudinally extending bearing 15 in which a shaft 16 is journaled with a bevel gear 17 suitably secured to the front end of shaft 16 engaging a similar gear 18 secured to the upper end of shaft 11.

A steering wheel shaft 19 is connected at its front end to the rear end of shaft 16 by a conventional type of universal joint 20 and a steering wheel 21 is suitably secured to the rear end of shaft 19. The shaft 19 is rotatably supported in a bracket 22 rising from a resilient bar or spring 23 which is inclined upwardly at its rear end and provided with a seat 24 and which is curved downwardly and rearwardly at its front end as shown at 25 and suitably secured to frame 5 immediately rearwardly of steering column 10.

A bracket or frame 26 rises from the central portion of frame 5 and to which a lever 27 is rockably supported adjacent its lower end, the lever extending upwardly in a rearwardly inclined direction and connected to the rear end of resilient bar 23 by a pivoted link 28. The lower end of lever 27 is formed with a yoke 29 in which a collar 30 is pivotally supported, the collar being slidable vertically on a connecting arm 31 which is pivoted at its upper end to the front portion of bracket 26.

A toothed ratchet operating arm 32 is pivoted at its front end to the lower end of connecting arm 31, the lower rear edge of arm 32 being formed with teeth 33 resting on a ratchet 34 secured to the inner end of axle 8.

A second toothed ratchet operating arm 35 is pivoted at its front end to the upper portion of lever 27 with its teeth 36 resting on a ratchet 37 secured to the inner end of axle 8a.

The ratchets 34 and 37 are of duplicate construction and include a hub 38 secured to its axle and having an internal ratchet 39 secured to the hub. An external ratchet 40 is also secured to hub 38 and a dog 41 is pivoted to the inside of external ratchet 40 with a spring 42 holding the dog in engagement with the internal ratchet 39. The internal and external ratchets provide a free wheeling action for the axles without resulting in the rotation of external ratchet 40 and also provides a differential movement of the ratchet assemblies 34 and 37 when the vehicle is turning toward the right or left.

In the operation of the device, an oscillating movement is imparted to resilient bar 23 by a child occupying seat 24 which rocks lever 27 forwardly and rearwardly to push and pull arms 32 and 35 for rotating the ratchets 34 and 37 in a driving action.

As the lower end of lever 27 rocks backwardly and forwardly the collar 30 pivoted to the lever slides vertically on connecting arm 30 to increase the throw of arm 32 to correspond substantially to the throw of arm 35 and also to reduce raising and lowering movement of arm 32 during its reciprocating movement to a minimum and to prevent interference with a foot rest 43 supported on frame 5.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A velocipede comprising a wheel supported frame and including a pair of rear drive wheels and a front steering wheel, a ratchet for each rear wheel, an oscillating seat supported on the frame, a rockable lever connected at one end to the seat, a toothed ratchet operating arm engaging each ratchet, one of said arms being pivoted directly to the lever, and means connecting the other of said arms to the lever for opposite movement of the arms, said means comprising a vertically swingable bar pivoted at its upper end to the frame and pivotally connected at its lower end to said second named arm, and a collar slidably mounted on the bar and connected to said lever.

2. A velocipede comprising a wheel supported frame and including a pair of rear drive wheels and a front steering wheel, a ratchet for each rear wheel, an oscillating seat supported on the frame, a vertically rockable lever pivoted to the frame and having an upper end projecting above the frame and pivoted to the seat, a pair of toothed arms extending longitudinally of the frame and resting at their rear ends on the respective ratchets, one of said arms being pivotally connected at its front end to the upper portion of said lever, and means connecting the front end of the other of said arms to the lower end of the lever to provide an increased throw in the last-named arm, said means comprising a vertically rockable member connecting the front end of the last-named arm to the frame and positioned at an angle with respect to the lever, and means at the lower end of the lever slidable on said member.

3. A velocipede comprising a wheel supported frame and including a pair of rear drive wheels and a front steering wheel, a ratchet for each rear wheel, an oscillating seat supported on the frame, a rockable lever connected at one end to the seat, a pair of toothed arms resting at their rear ends on the respective ratchets, one of said arms being pivotally connected at its front end to the upper portion of said lever, means pivotally connecting the front end of the other of said arms to the lower portion of the lever to provide an increased throw in the last named arm, said means comprising a vertically swingable bar pivoted at its upper end to the frame and pivotally connected at its lower end to said second named arm, and a collar slidably mounted on the bar and connected to said lever.

4. A velocipede comprising a wheel supported frame and including a pair of rear wheels and a front wheel, a ratchet for each rear wheel, a rearwardly inclined spring bar connected at its front end to the frame, a seat at the rear end of the bar, a rockable lever connected at one end to the seat and pivoted at an intermediate point to the frame, toothed ratchet operating arms pivoted to the lever and resting on the respective ratchets, and a steering wheel supported on said bar and connected to the front wheel.

ARLANDO ALEN GREEN.

REFERENCES CITED

The following references are of record in the file of this patent:

UNITED STATES PATENTS

| Number | Name | Date |
|---|---|---|
| 355,324 | Kramer | Jan. 4, 1884 |
| 1,376,132 | Ballin | Apr. 26, 1921 |
| 1,978,066 | Vanderbosch | Oct. 23, 1934 |

FOREIGN PATENTS

| Number | Country | Date |
|---|---|---|
| 326,834 | Italy | June 22, 1935 |